Dec. 23, 1969 J. S. SENEY 3,486,047

TRANSDUCER

Filed Feb. 20, 1967 4 Sheets-Sheet 1

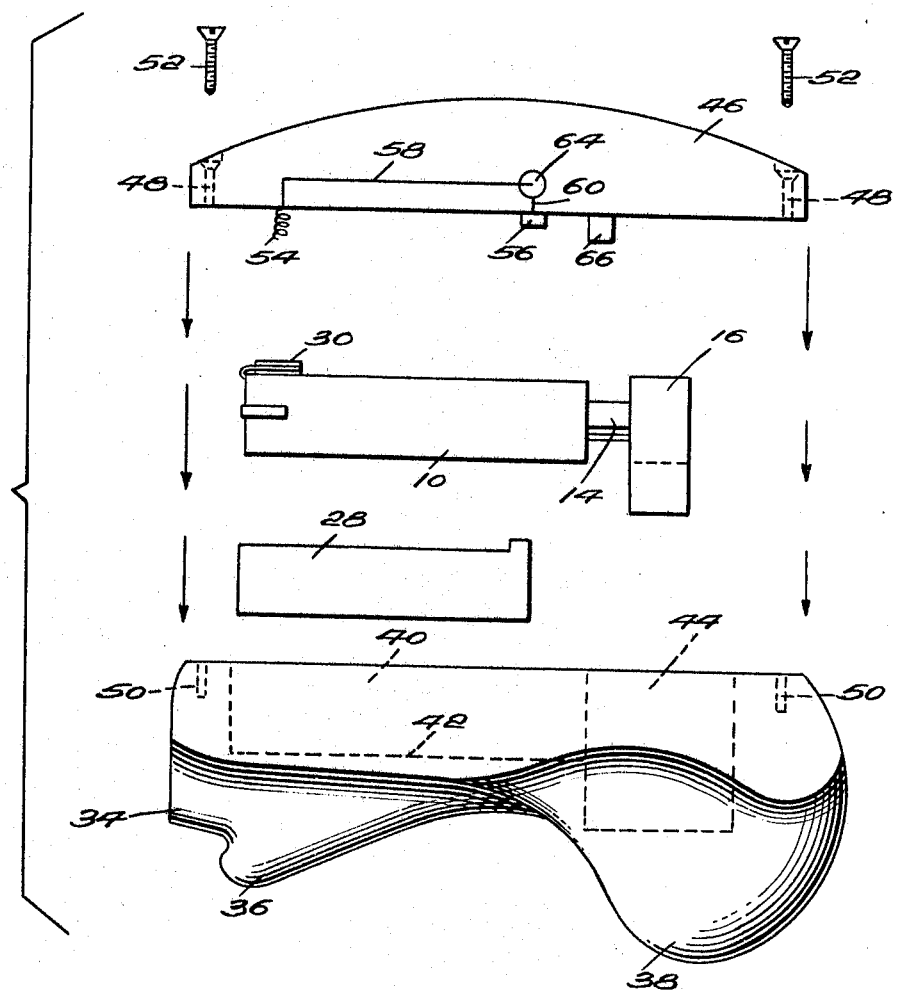

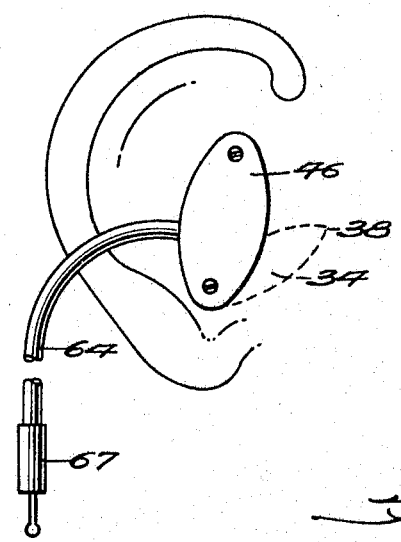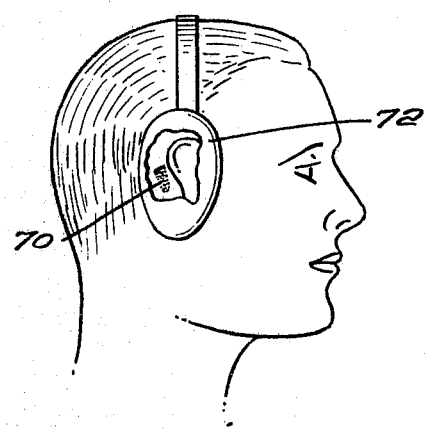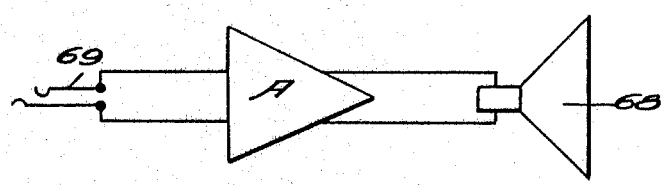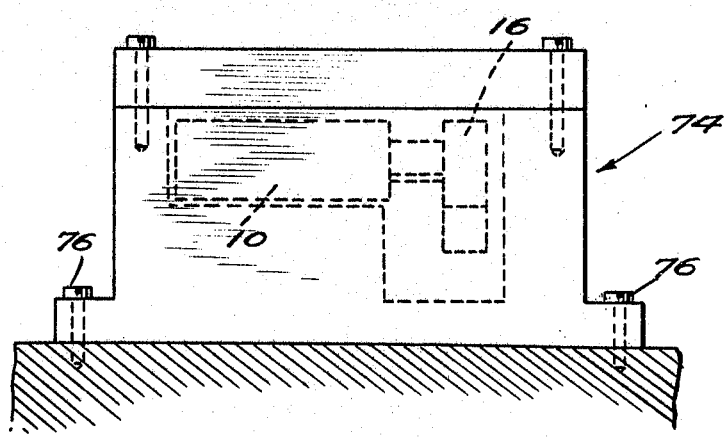

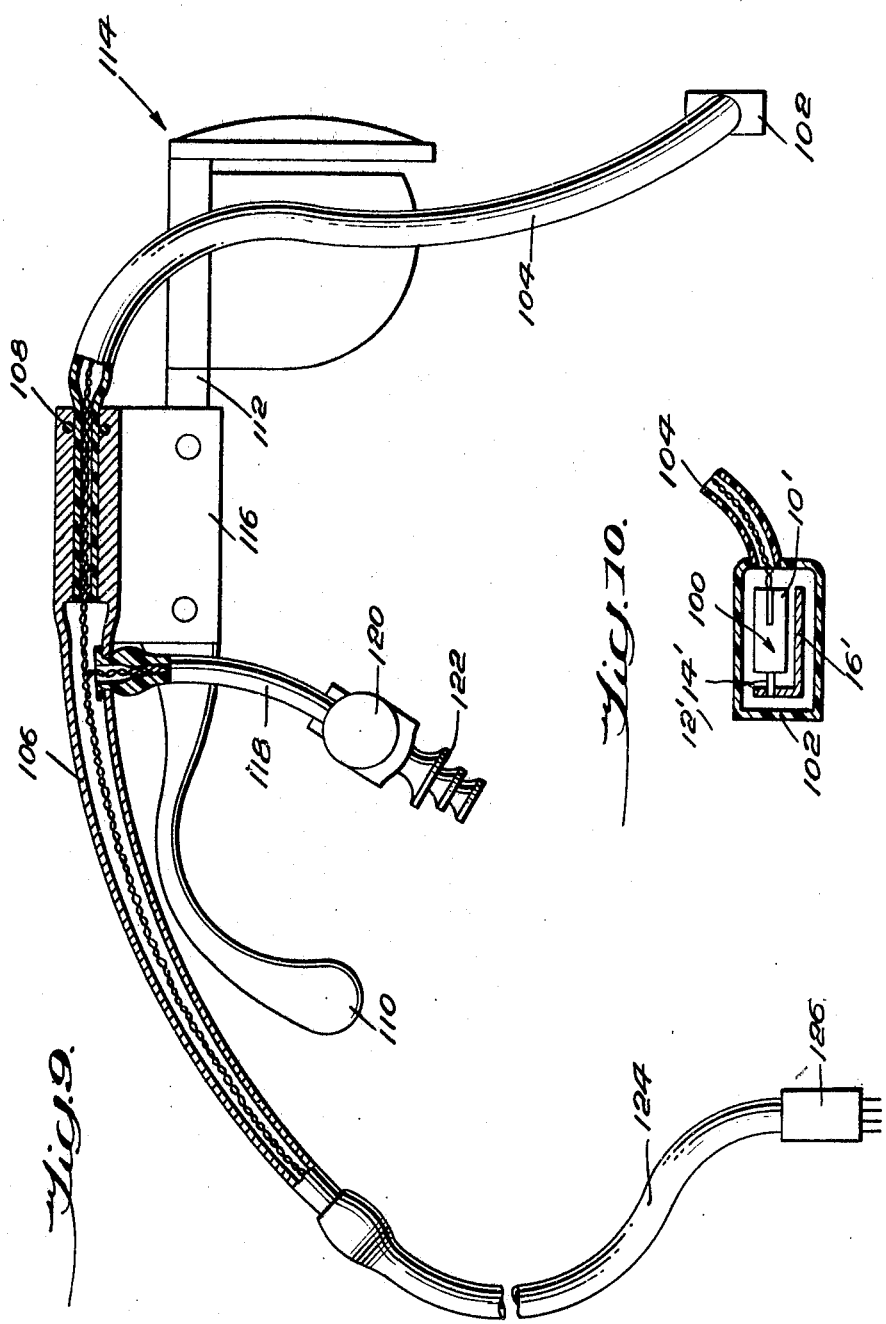

United States Patent Office 3,486,047
Patented Dec. 23, 1969

3,486,047
TRANSDUCER
John Seymour Seney, Seaford, Del., assignor to E. I. du Pont de Nemours and Company, Wilmington, Del., a corporation of Delaware
Filed Feb. 20, 1967, Ser. No. 617,179
Int. Cl. H04r 17/02
U.S. Cl. 310—8.6                                5 Claims

ABSTRACT OF THE DISCLOSURE

In a piezoelectric crystal unit, an elongated crystal is embedded at one end in a support and carries an unbalanced inertial mass at its outer end. The support has a surface adapted for contact with a vibratile object such as human auricular structure.

---

The invention relates generally to vibroelectric transducers and, more particularly, to an improved piezoelectric crystal unit.

Piezoelectric transducers are known in the accelerometer and microphone arts (e.g., see Feinstein U.S. Patent 2,830,202 and Carlisle U.S. Patent 2,786,899). It is also known to support an inertial mass on the diaphragm of an electroacoustic magnetic microphone (U.S. Patent 2,500,541 to Greibach) and to locate an electroacoustic microphone in an ear-insert (e.g., see Bredon U.S. Patent 3,258,533). Although such transducers have been satisfactory in many applications, they either require complicated external circuitry, have low sensitivity, or are expensive to manufacture and maintain.

Those difficulties noted above have been overcome and the several advantages disclosed herein have been achieved with a vibroelectric transducer in which a pair of elongated piezoelectric crystals project outwardly from ends embedded in a support. The crystals are in proximal parallelism, with their faces disposed at acute angles, and carry an unbalanced inertial mass at their outer ends. The support has a surface adapted for contact with a vibratile object.

Construction and operation of the improved transducer will be apparent from the following specification wherein reference is made to the accompanying drawings in which:

FIG. 4 is an exploded view of an ear-insert into which the piezoelectric unit of FIGS. 1–3 has been incorporated as a speech transducer;

FIG. 5 shows the ear-insert of FIG. 4 mounted in and on an ear;

FIG. 6 is a typical circuit diagram for use with the speech transducers of FIGS. 4, 5, 7 and 9;

FIG. 7 is a pictorial illustration of the transducer in a circumaural protection device;

FIG. 8 shows another adaptation of the transducer as a vibration sensor; and

FIGS. 9, 10 show a modification of the transducer at the extremity of a vibratile element which extends outwardly from a spectacle bow.

Figure 1:
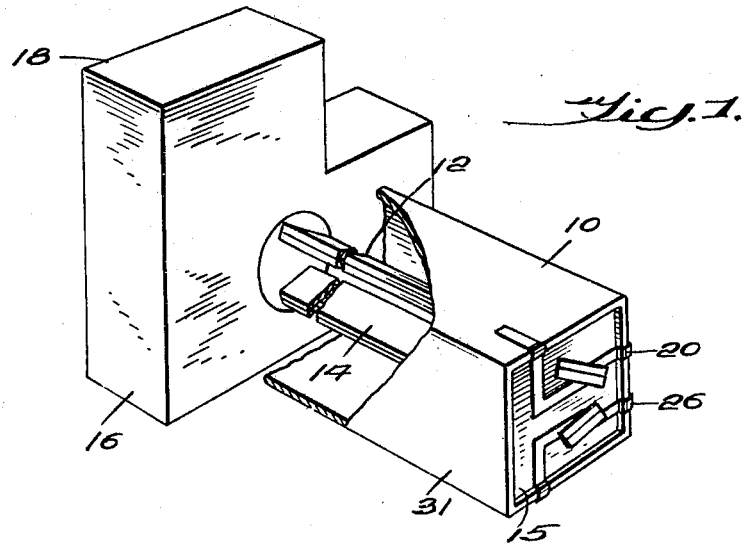
FIGURE 1 is an isometric view, partially cut away, of a first embodiment of the transducer.
Figure 2:
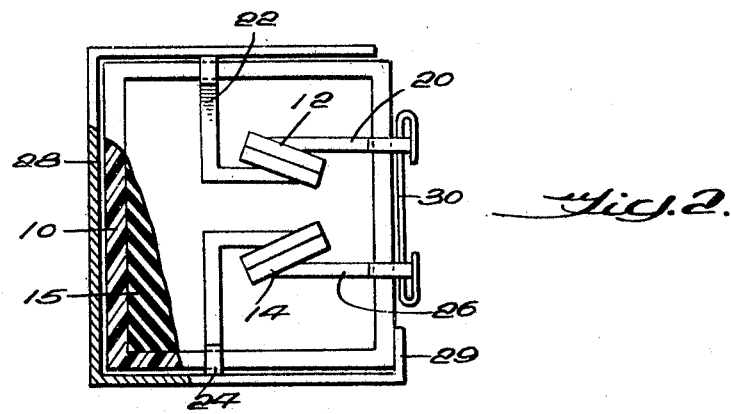
FIGS. 2 and 3 are an end and a top view, respectively, of the transducer, parts having been broken away and sectioned to show details of various components.
Figure 3:
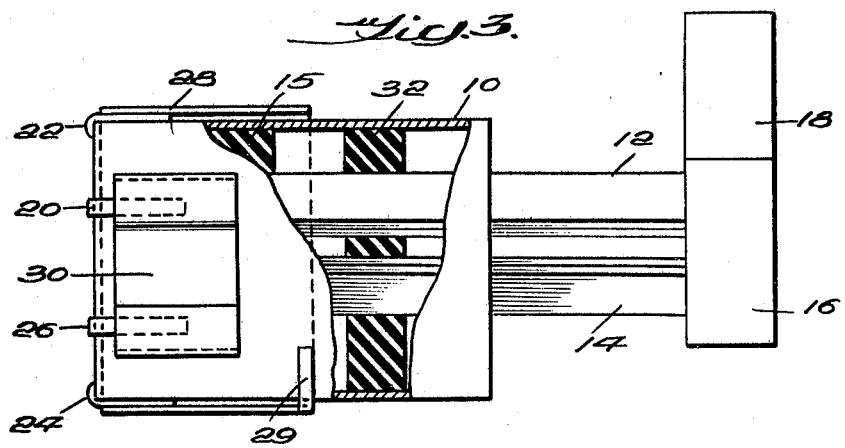

With reference to FIGS. 1–3, the illustrated transducer has an elongated box-like hollow casing 10 which is made of rigid electrical insulating material such as a molded plastic. Mounted within this casing and projecting outward from one end, there are two elongated piezoelectric bilaminate crystal elements or benders 12, 14. The long axes of these benders are in proximal parallelism whereas their faces form an acute angle of approximately 75°.

The mounted ends of benders 12, 14 are embedded in a semi-rigid plastic insulating plug 15 located near the outer end of casing 10, i.e., plug 15 and casing 10 provide a unitary cantilever support for the crystals.

The outer ends of crystals 12, 14 support and carry an inertial mass 16 in the form of an L-shaped monosymmetric lead solid having a foot 18 extending from one of its sides. With foot 18, the center of gravity is offset from the location of crystals 12, 14, leading inertial mass 16 unbalanced.

Where used herein, the term "monosymmetric" is meant to be descriptive of those mass configurations which woulde be divisible into similar halves in but one longitudinal plane.

As shown in FIG. 2, electrical leads 20, 22, 24 and 26 extend from the four faces of benders 12, 14. Each of these leads is made of thin gold metal foil. They extend along and are pressed against respective faces of the benders by insulating plug 15. Leads 22, 24 extend across the end of plug 15 and are bent around and along opposed sides of casing 10. Leads 20, 26 extend along the end of plug 15 and are bent around and extend across a third side of casing 10. A small leaf 30 of gold foil is slipped underneath the ends of leads 20, 26 and then folded over to form an electrical connection. A second leaf of foil 28 is wrapped around the casing of FIG. 1 in such a manner as to contact the leads 22 and 24. It also has a finger 29 projecting over a third side of casing 10 but displaced outwardly from foil leaf 30. The fourth and remaining side of casing 10 presents a contact surface 31 (FIG. 1) adapted for placement against a vibratile object.

An optional resilient bushing 32 (FIG. 3) is located near the open end of casing 10 as an additional support for crystals 12, 14 adjacent their mid-points. Bushing 32 also provides mechanical shock absorption.

The ear-insert shown in FIGS. 4, 5 includes a molded rigid acrylic ear plug 34 provided with lobes 36, 38 shaped to fit within the concha and on the anti-helix of a user's ear. When placed within and on the ear, firm contact is made with those portions adjacent the cartilage of auricula and the other cartilagenous parts of the external acoustic meatus. A shaped hollow cavity 40 within plug 34 is adapted to receive the piezoelectric unit of FIGS. 1–3 which, in this application, functions as a speech transducer. More particularly, cavity 40 has a mating surface 42 for contact surface 31 of casing 10. A deeper portion 44 of cavity 40 is shaped and dimensioned to provide enough space that there is no contact between mass 16 and plug 34. A cover 46 is provided for plug 34 to hold casing 10 firmly in place and provide electrical contacts with the transducer terminals 29, 30. Holes 48 at either end of cover 46 are aligned with threaded holes 50 in plug 34 to receive screws 52 therethrough and fasten cover 46 to plug 34. A metallic spring 54 is provided and positioned in the cover 46 so that, when the cover is in place, spring 54 will contact leaf 30. Similarly, a metallic projection 56 is provided and positioned to contact finger 29 of foil 28 when cover 46 is in place. A square boss 66 is provided on the inner surface of cover 46 and arranged to position and hold casing 10 of the transducer in place. Wires 58, 60 lead from elements 54, 56 to a coaxial cable 64 which extends through cover 46 to an electrical plug contactor 67 (FIG. 5). Plug 67 fits into an appropriate jack 69 in an amplifier which is used to drive a speaker 68 (FIG. 6).

An alternate application is shown in FIG. 7 wherein a piezoelectric unit of this invention is mounted in a rigid holder 70 which is fixed to the inside of a circumaural protection device 72 in such a manner that holder 70 is firmly pressed against the skull near the mastoid region adjacent the ear or near the upper end of the jaw bone just below and behind the ear. In this way, speech vibrations transmitted through auricular or other firm structure can be picked up by the transducer in holder 70. Signals may be brought out by a cable of the type shown at 64 in FIG. 5 or may be transmitted by a miniature radio transmitter associated with device 72.

In the vibration sensor of FIG. 8, a hollow holder 74 is provided to support casing 10 of the piezoelectric unit and provide free space for mass 16. The support 74 is provided with fasteners such as screws 76 in order to fasten it to a base member 78 such as a motor or bearing housing and to provide vibration measurements during dynamic balancing.

Construction of the transducer embodiment shown in FIGS. 1–8 is inexpensive and easy to carry out, e.g., by modification of a commercial stero phonograph cartridge (model 11T7, Astatic Corp., Conneaut, Ohio). First, the casing of the cartridge is placed in a jig and held by the end near the terminals. The end of the casing away from the terminals is cut through by means of a fine saw in order to leave approximately 0.45 inch of casing remaining. A lead mass is then formed into the shape shown at 16 in FIG. 1. The modified cartridge is placed in a second jig provided to hold both the casing at one end and the lead mass. This jig aligns these two parts so that the needle end of the cartridge projects through a hole in the lead mass and the inner face of the mass is flush with the outer ends of the two benders. The lead mass is then cemented to the benders and that portion of the needle holder contained within the hole in the lead mass. Epoxy cement is used. The projecting end of the needle holder is then cut away. Connectors 28, 30 are cut from gold foil and applied as shown in FIGS. 2 and 3. The transducer is now ready for placement in an ear-insert as in FIG. 4 or in the holders of FIGS. 7 and 8. In some cases, it is desirable to increase the high frequency sensitivity of the transducer. This has been accomplished by placing some epoxy cement inside the casing near the ends of the benders contained therein, as shown at 32 in FIG. 3. This results in a more rigid support for the inner ends of the crystal benders and increases the resonant frequency of the transducer.

In operation, the transducer is mounted so that contact surface 31 of casing 10 is rigidly linked to the object whose vibration is to be detected. Care must be taken that mass 16 is supported solely by the two benders 12, 14 and kept out of contact with surrounding structure. With this cantilever arrangement on a solid support, the cased piezoelectric unit is insensitive to acoustic influences, i.e. is soundproof. However, any vibration imposed on the support will cause not only a bending but also a twisting of the benders under the inertial influence of the monosymmetric, unbalanced mass 16. This bending and twisting of the crystals induces an electric potential between their faces. Because of the phase relations between the signals from the two benders and/or the input impedance of, for example, the amplifier shown in FIG. 6, the output of the transducer is greatest with the benders connected in parallel as shown in FIG. 3. For other uses, particularly where a device such as a high impedance meter is used for readout, a series connection may produce optimum sensitivity.

A modification of the piezoelectric unit has been used in the speech transducer shown in FIG. 9. Here, case 10' of unit 100 is mounted in, in contact with and affixed to a small sealed box 102. Box 102 is cemented to the lower end of an elongated, vibratile, plastic tube 104 curved to extend from the temple region downwardly and across the face to a point in front of and close to the mouth of a user. The upper end of tube 104 is pivotally mounted in one end of an elongated hollow member 106 and sealed by means of an O ring 108. Member 106 extends back and curves downwardly past the earpiece end 110 of a bow 112 of spectacles 114. A metal bracket 116 is fastened to the bow 112 near the temple region and is arranged to hold the upper end of member 106. A short length of flexible tubing 118 is cemented at its upper end in an appropriate hole in member 106 just behind the bracket 116. The lower end of tube 118 is cemented to a miniature speaker 120. The output tube of speaker 120 carries a conventional soft rubber ear plug 122. Tube 118 is made of sufficient length to allow insertion of plug 122 in an ear of a wearer of the spectacles 114. A second, elongated flexible tube 124 is cemented at one end to the extremity of member 106 and is sealed at the other to a four pin electrical plug 126. Two wires extend from unit 100 in box 102 through tube 104, member 106, tube 124 to plug 126 and are connected to two pins. Similarly, two wires extend from speaker 120 through tube 118 and are connected to the remaining two pins. Plug 126 fits an appropriate receiving plug in a miniature amplifier which may be worn in a pocket of the user.

The modified piezoelectric unit 100 shown in FIG. 10 differs from that shown in FIGS. 1–3 by formation of mass 16' from a rectangular strip of lead which is bent to form an L-shaped piece with its short leg cemented to the unsupported ends of benders 12', 14' and with its long leg extending parallel to the benders and adjacent one side of case 10' but out of contact with any structure. This configuration provides improved sensitivity and requires less space.

In operation, bow 112 and bracket 116 pick up speech vibrations in the bone structure at the temple. These vibrations are transmitted down tube 104 to box 102 and piezoelectric unit 100. The frequency response to a user's voice is improved by virtue of direct speech vibrations from the mouth impressed through the short air space and against box 102. Motion of box 102 at the end of tube 104 serves to actuate unit 100. Surprisingly, it has been found that this exposed speech transducer is highly insensitive to ambient noise. Thus, when the device is worn with a conventional soft rubber ear plug, easy communication is attained between two persons by connecting their devices together through appropriate amplifiers or through radio transreceivers. The vibroelectric nature of the response has been demonstrated by rotating tube 104 upwardly above a wearer's eyes. A slight decrease in response was more than offset by an application of light pressure to the outer surface of bracket 116, i.e., by better contact with the temple region.

The piezoelectric unit disclosed herein has great utility as a speech transducer in areas where there is a high level of ambient noise. High sensitivity to vibrations not only insures intelligible speech reproductions but also gives the unit utility in other applications of the type shown in FIG. 8. Where insensitivity to acoustic influences is the primary requirement, one of the crystals can be omitted. Similarly, there are many instances where casing 10 can be eliminated in favor of a suitably shaped contact surface on plug 15. Other adaptations and modifications will occur to those skilled in the art without departing from the spirit of the present invention which is, therefore, intended to be limited only by the scope of the appended claims.

Having thus described the invention, what is claimed as new and desired to be secured by Letters Patent is:

1. A vibroelectric transducer comprising: a support having a contact surface adapted for placement against a vibratile object; an elongated piezoelectric element mounted at one end on said support and projecting outwardly therefrom; and unbalanced inertial mass affixed to and supported by the outer end of said element.

2. The transducer of claim 1 wherein said element is a bilaminate.

3. The transducer of claim 1 wherein said support is an electrically nonconducting casing with a contained plug of electrically insulating material and wherein the mounted ends of the elements are embedded in the plug.

4. A vibroelectric speech transducer comprising: a support having a contact surface adapted to receive speech vibrations via bone conduction; an elongated piezoelectric element affixed at one end on said support and projecting outwardly therefrom; and an unbalanced inertial mass affixed to and supported by the outer end of said element.

5. A vibroelectric speech transducer comprising: a nonconducting casing having a surface adapted for vibratile contact with auricular structure; a plug of insulating material in said casing; a pair of elongated piezoelectric crystals projecting outwardly from ends embedded in the plug, said crystals being in proximal parallelism with their faces spaced and angularly disposed; and an unbalanced inertial mass affixed to and supported by said crystals at their outer ends.

References Cited

UNITED STATES PATENTS

| | | | |
|---|---|---|---|
| 2,105,011 | 1/1938 | Williams | 310—8.6 |
| 2,045,403 | 6/1936 | Nicholides | 310—8.6 |
| 2,045,404 | 6/1936 | Nicholides | 310—8.6 |
| 2,045,427 | 6/1936 | White | 310—8.6 |
| 2,702,354 | 2/1955 | Chorpening | 310—8.6 |
| 3,100,821 | 8/1963 | Swinehart | 310—9.1 |
| 3,186,237 | 6/1965 | Forrest | 310—9.1 |
| 3,181,016 | 4/1965 | Rosenman | 310—8.6 |
| 3,215,786 | 11/1965 | Sanfield | 310—9.1 |
| 3,271,527 | 9/1966 | Hammond | 310—9.1 |
| 3,283,181 | 11/1966 | Johanson | 310—8.6 |

J. D. MILLER, Primary Examiner

U.S. Cl. X.R.

179—100.41; 310—9.1